S. KORPER.
SAFETY CORN PARER.
APPLICATION FILED MAR. 30, 1911.
1,014,154.
Patented Jan. 9, 1912.
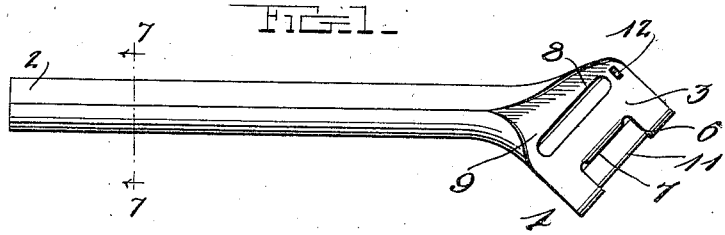
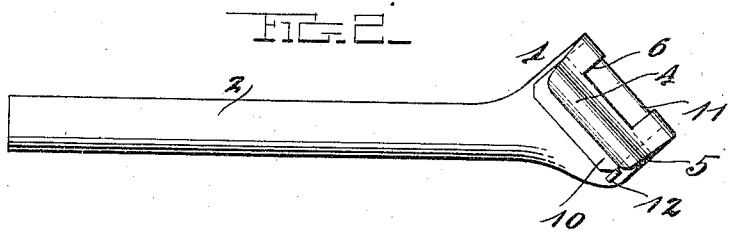
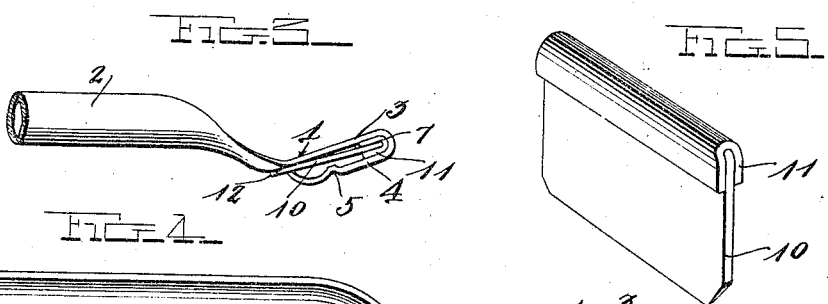
Witnesses
I. R. Pierce
O. B. Hopkins
Inventor
Simon Korper.
by H. B. Willson & Co.
Attorneys

UNITED STATES PATENT OFFICE.

SIMON KORPER, OF NEW YORK, N. Y.

SAFETY CORN-PARER.

1,014,154. Specification of Letters Patent. Patented Jan. 9, 1912.

Application filed March 30, 1911. Serial No. 617,926. REISSUED

*To all whom it may concern:*

Be it known that I, SIMON KORPER, a citizen of the United States, residing at New York, in the county of New York and State of New York, have invented certain new and useful Improvements in Safety Corn-Parers; and I do declare the following to be a full, clear, and exact description of the invention, such as will enable others skilled in the art to which it appertains to use the same.

This invention relates to safety corn parers.

One object of the invention is to provide a corn parer having an improved casing and blade holder and guard, whereby the blade is permitted to cut only a very thin shaving thus obviating the danger of too closely cutting the corn or calloused parts and mainly to prevent engaging the whole edge of the blade at once.

Another object is to provide a corn parer which will be simple, strong and durable in construction, efficient in operation and in which all parts except the blade are formed from a single piece of metal, the handle and blade casing being set at an angle to each other.

With these and other objects in view the invention consists of the improved construction, combination and arrangement of parts which will be fully described hereinafter and afterward specifically claimed.

In the accompanying drawings: Figure 1 is a top plan view of a corn parer constructed in accordance with my invention; Fig. 2 is a bottom plan view; Fig. 3 is a side view; Fig. 4 is a central vertical longitudinal section; Fig. 5 is a detail view of the blade; Fig. 6 is an enlarged view of the stop for preventing the blade passing out the opposite side of the holder while being inserted; Fig. 7 is a detail cross sectional view through the handle on the line 7—7 of Fig. 1.

My improved corn parer comprises a combined blade casing and guard 1 and a handle 2 formed from a single piece of metal. The blade casing 1 is bent at an angle to the handle as shown in Figs. 1 and 2 of the drawing to cause the blade to effect a draw cut and said portion comprises an upper substantially flat plate 3 having its outer end bent back or doubled upon itself to form a spring blade holder and guard 4. The spring blade holder 4 is preferably curved transversely forming an inwardly projecting rib 5. In the plate 3 at the bend or where it is folded is an opening 6 in the form of a notch in the outer end of the blade casing of the device whereby the blade may be grasped by the fingers and readily adjusted. The inner wall of the opening 6 is bent inward whereby is formed a tongue 7 bent inwardly to bear upon the blade when the latter is inserted in the casing and act as a pawl against the backing strip 11, hereinafter described to prevent accidental forward movement of the blade. In the plate 3 near the inner end thereof is a slot 8 immediately opposite the edge of the blade to permit the shavings or parings to pass through the plate 3 and upon the depressed or curved outer side of the same, said plate and the adjacent part of the handle thus forming a receptacle 9 for the parings, as clearly shown in Fig. 1 of the drawings.

The handle 2 of the device is formed by bringing the edges of the metal together thus forming a cylindrical tube which may be of any desired length. Adapted to be engaged by the blade holder 4 is a blade 10 which may be of any suitable construction and is preferably in the form of a thin steel plate having one edge sharpened and on its opposite edge a backing strip 11. The blade and backing strip reach from the folded edge of the plate 3 to the slot 8 in which position the blade is held by the front edge of the spring holder 4, the rib 5 and the pawl 7 as clearly shown in Fig. 4 of the drawings. To place the blade in the casing the blade is inserted between the plate 3 and the spring holder 4 from one side of the casing and in order to prevent the blade projecting out through the opposite side, a suitable stop 12 is formed preferably by indenting the metal of the plate 3 thus producing a teat on the opposite side of the plate with which the end of the blade will engage when inserted in place. The blade when thus arranged may be adjusted to bring its cutting edge in proper position with respect to the slot 8 by grasping the backing strip on the outer edge of the blade through the notch or opening 6 in the outer edge of the casing.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention claimed.

Having thus described my invention what I claim is:

1. As a new article of manufacture, a corn parer comprising a handle and a blade formed of a single sheet of metal, the handle consisting of part of the plate bent into tubular form, the edges being gradually opened out to flatten one end of the metal to form a blade casing, said flattened end lying substantially in the plane of the axis of the handle and laterally out of line therewith at an angle to said axis and folded back upon itself to form a blade holder and guide, whereby the blade is brought into position at substantially an angle of forty-five degrees to the axis of the handle.

2. As a new article of manufacture a corn parer comprising a handle and a blade casing formed of a single sheet of metal, the handle consisting of part of the plate bent into tubular form, the edges being gradually opened out to flatten one end of the metal to form the casing, said flattened end lying laterally out of line at an angle to the handle portion and folded back upon itself to form a blade holder and guide, a notch being formed in the folded edge to expose the edge of the back of a blade inserted in the casing, the inner edge wall of the notch bearing against the back piece of the blade to prevent too great a projection of the edge of the blade.

In testimony whereof I have hereunto set my hand in presence of two subscribing witnesses.

SIMON KORPER.

Witnesses:
 HENRY H. DAVIS,
 GERTRUDE D. HYAMS.